United States Patent
Geiger et al.

(10) Patent No.: US 6,700,280 B1
(45) Date of Patent: Mar. 2, 2004

(54) DRIVE UNIT WITH AN ELECTRIC MACHINE

(75) Inventors: Martin Geiger, Güntersleben (DE); Bernhard Schierling, Kürnach (DE)

(73) Assignee: Mannesmann Sachs AG, Schweinfurt (DE)

( * ) Notice: Subject to any disclaimer, the term of this patent is extended or adjusted under 35 U.S.C. 154(b) by 36 days.

(21) Appl. No.: 09/992,986

(22) Filed: Nov. 5, 2001

(30) Foreign Application Priority Data

Nov. 9, 2000 (DE) .......................... 100 55 392

(51) Int. Cl.⁷ .............................. H02K 1/06; F02P 5/00
(52) U.S. Cl. ............ 310/193; 310/156.38; 310/156.46; 123/599; 123/149 D
(58) Field of Search ................. 310/75 R, 82, 310/84, 103, 216, 254, 261, 67 R

(56) References Cited

U.S. PATENT DOCUMENTS

| | | | |
|---|---|---|---|
| 2,575,153 A | 11/1951 | Wightman | 171/252 |
| 3,723,029 A * | 3/1973 | Laing | 310/104 |
| 4,043,706 A * | 8/1977 | Walker | 310/104 |
| 4,471,253 A * | 9/1984 | Laing | 310/217 |
| 4,628,891 A * | 12/1986 | Asai et al. | 123/599 |
| 5,713,427 A * | 2/1998 | Lutz et al. | 180/65.4 |
| 5,952,746 A | 9/1999 | Mittmann et al. | 310/42 |

FOREIGN PATENT DOCUMENTS

| | | | |
|---|---|---|---|
| DE | 199 08 450 | 2/1999 | |
| DE | 199 37 545 | 2/2000 | |
| EP | 0 944 158 | 9/1999 | .......... H02K/19/10 |
| GB | 2 182 808 | 5/1987 | .......... H02K/1/06 |
| JP | 50 022206 | 3/1975 | |

* cited by examiner

Primary Examiner—Tran Nguyen
(74) Attorney, Agent, or Firm—Cohen, Pontani, Lieberman & Pavane

(57) ABSTRACT

A drive unit with a drive and an electric machine, the drive being equipped with a drive shaft and the electric machine with a stator and a rotor. The rotor is coaxial to the stator and connected to the drive shaft for the transmission of torque, where the stator and the rotor interact with each other across an air gap, and where the drive shaft causes the rotor to execute a wobbling motion. In a cross section parallel to the drive shaft, the geometric course of at least one of the two surfaces forming the boundaries of the air gap, i.e., the surface of the rotor or the surface of the stator, is designed so that it at least approximates the geometric slowing curve ($V_R$) described by the wobbling motion of the rotor.

9 Claims, 2 Drawing Sheets

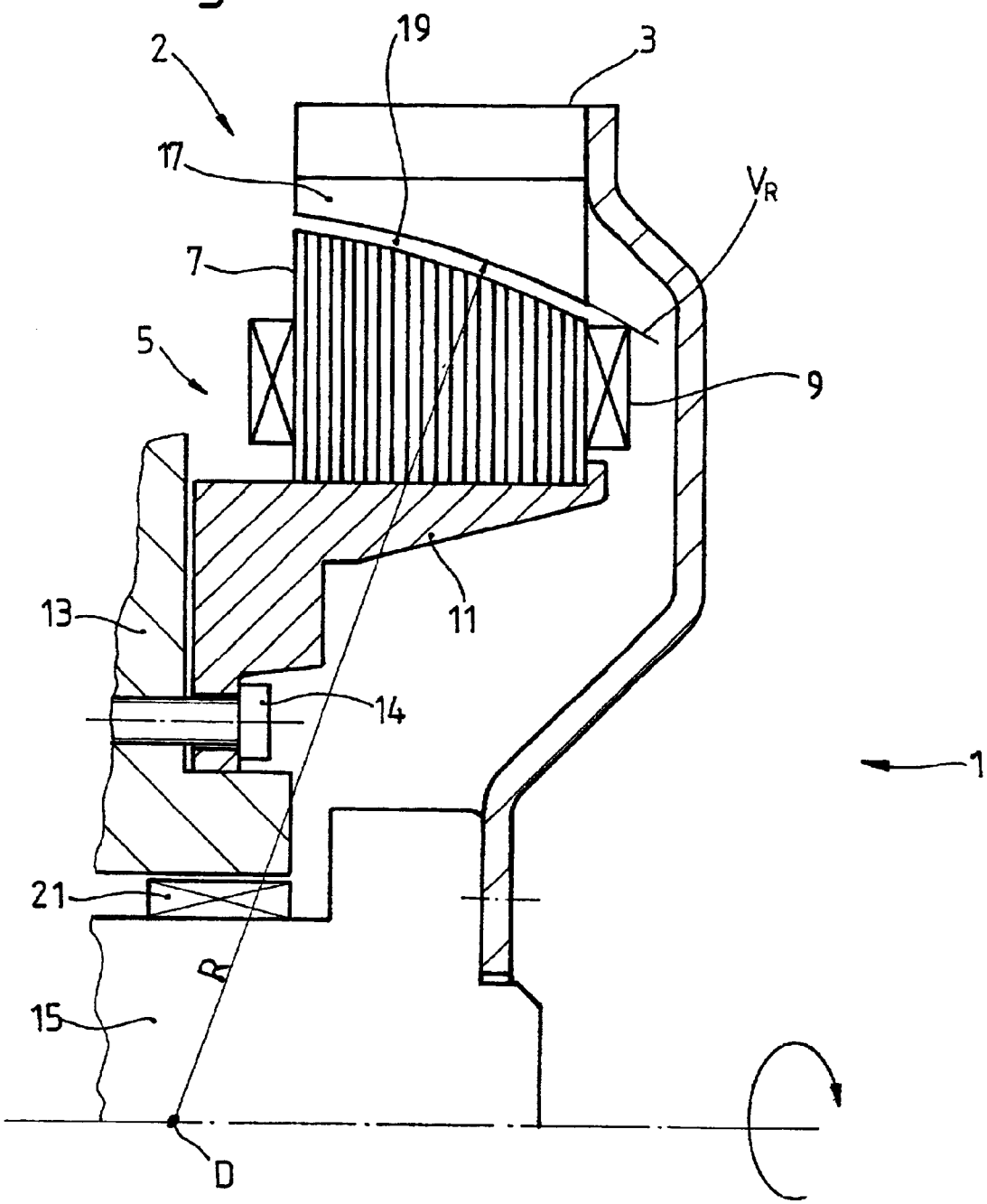

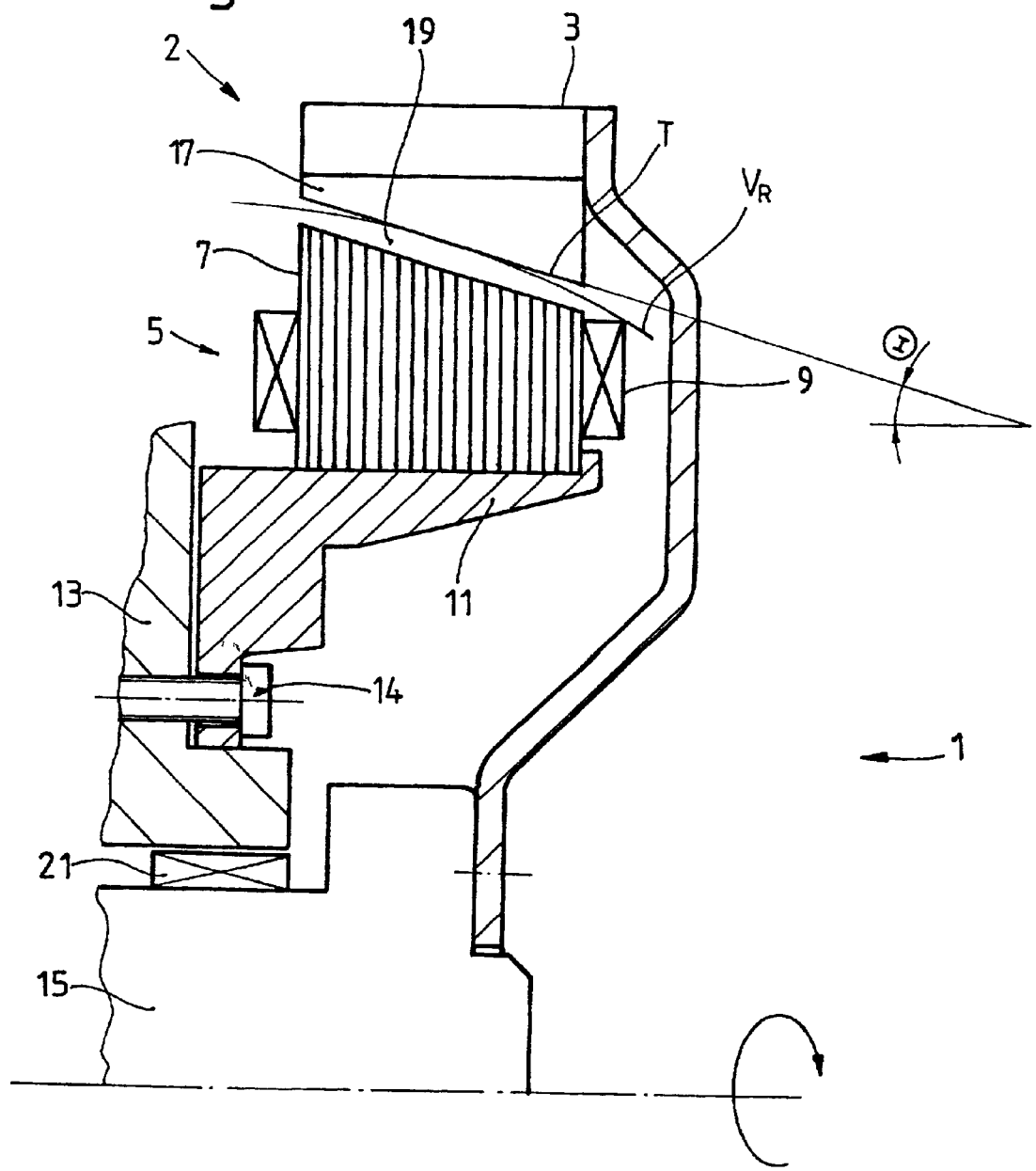

DRIVE UNIT WITH AN ELECTRIC MACHINE

BACKGROUND OF THE INVENTION

1. Field of the Invention

The invention pertains to a drive unit with a drive and an electric machine, the drive being equipped with a drive shaft and the electric machine with a stator and a rotor, the rotor being coaxial to the stator and in effective torque-transmitting connection with the drive shaft, where the stator and the rotor interact with each other across an air gap, and where the drive shaft causes the rotor to execute a wobbling motion.

2. Description of the Related Art

Drive units of this type are known from, for example, the area of motor vehicle technology, where an internal combustion engine is combined with an electric machine to form a hybrid drive or where the electric machine is provided as a starter-generator. The electric machine can operate as a motor for starting the internal combustion engine or serve alone or in cooperation with an internal combustion engine to drive the vehicle. When the electric machine is operating as a generator, it can supply power to the users of electricity in the vehicle or store electrical energy in a storage unit.

The stator of the electric machine is usually stationary; for example, it can be mounted on the housing of the internal combustible engine or on the transmission housing. The rotor is in effective connection with the crankshaft of the internal combustion engine and can be connected to the crankshaft either directly or indirectly by way of extension pieces. A design of this type is shown in, for example, U.S. Pat. No. 5,952,746.

One of the characteristics of a rotating electric machine is the presence of an air gap between the stationary stator and the rotor, which moves relative to the stator. This air gap allows the stator and the rotor to interact electromagnetically with each other. To obtain an electric machine of high efficiency, it is necessary for this air gap to be as narrow as possible without jeopardizing the freedom of the rotor to rotate; the gap must also be constant in the circumferential direction. Typical values for the air gaps of synchronous machines are in the range of 1–1.2 mm, and the air gaps of asynchronous machines are typically in the range of 0.5k–0.7 mm.

As a result of its periodic, pulse-like operation, the internal combustible engine causes the crankshaft to execute flexural vibrations, which, for example, can be expressed as the slewing of the end of the crankshaft projecting from the internal combustion engine. In the case of an in-line engine, for example, this slewing motion occurs primarily in the plane defined by the stroke of the pistons. In addition, as a result of manufacturing variations in the bearings of the crankshaft, the crankshaft can also have a slight offset. As part of the continuing development of internal combustion engines, the degree to which the combustion chamber is filled with a fuel-air mixture has been increasing. The resulting rise in the combustion pressures increases the mechanical power output but also leads to the situation that, unless structural countermeasures are taken, the crankshaft is subjected to increased flexural vibrations.

During the operation of an internal combustion engine, therefore, the problem occurs that the rotor of an electric machine in effective connection with the crankshaft executes a wobbling motion. The slewing motion of the rotor is therefore superimposed on the rotational motion of the rotor, and thus the coaxial relationship between the rotor and the stator is impaired. This means that the radial dimension of the air gap of the electric machine is subject to continuous fluctuation as the crankshaft turns, which results in a considerable loss of efficiency and to variations in the moment produced by the electric machine, whether it is operating as a motor or as a generator. In addition, there is the very real danger that, as a result of the narrowness of the air gap, the rotor and the stator can come into contact with each other, which would damage the electric machine or even cause it to fail.

The problem described above has been known for a long time. Because it has been impossible so far to avoid or significantly to reduce the cause of the wobbling motion, that is, the flexural vibrations of the crankshaft, by technical improvements, efforts to remedy the problem have concentrated on modifications to the design of the electric machine.

In DE 199 37 545, an electric machine installed in the drive train of a vehicle comprising an internal combustion engine is described, in which machine the stator is attached rigidly to the housing. To decouple the rotor from the rotational irregularities of the drive shaft of the internal combustion engine, it is proposed that the rotor be supported on a bearing flange by at least one bearing, the flange being attached rigidly to the housing, and that the connection of the rotor to the drive shaft be designed with some elasticity. As a result of this measure, the concentricity of the rotor and the stator is maintained even during the operation of the internal combustion engine. This variant solves the problem, but because of the introduction of a separate rotor bearing, it is quite complicated and expensive.

DE 199 08 450 discloses an electric machine of the general type indicated above which is designed to exclude damage, especially the damage resulting from resonance vibrations of the rotor. According to the invention, a slip ring is provided, which limits the relative movement between the rotor and the stator in the radial direction. The disadvantage of this proposed electric machine is that it still allows fluctuations in the size of the air gap during operation of the engine. Only in the extreme case will the slip ring, which is intended to undergo wear during use, offer protection against destruction. A sacrifice in the efficiency of the electric machine is tolerated. The need to inspect the slip ring and to replace it after a certain period of operation also means additional maintenance work.

SUMMARY OF THE INVENTION

Proceeding from the basis described above, the object of the invention is to improve the design of an electric machine of the general type in question so that it allows reliable operation even under the influence of the flexural vibrations of the drive shaft of a drive, without the need for an additional rotor bearing or the introduction of protective parts which undergo wear.

The object is achieved by designing the geometric course of at least one of the two surfaces forming the boundaries of the air gap, i.e., the surface of either the rotor or of stator in a cross section parallel to the drive shaft, so that it at least approximates the geometric slewing curve described by the wobbling motion of the rotor. When the rotor and/or the stator is designed in this way, the rotational and wobbling motion of the rotor has little or no effect on the dimension of the air gap. The air gap therefore remains essentially constant, which has an advantageous effect on the efficiency of the electric machine. It is therefore impossible for any damage to be caused by contact between the rotor and the stator.

In an advantageous embodiment of the invention, the surfaces of the rotor and stator forming the boundaries of the air gap are essentially parallel to each other in a cross section parallel to the drive shaft. Thus a homogeneous magnetic field of constant strength in the axial direction can develop in the air gap, which also has a favorable effect on the efficiency of the electric machine.

It is especially advantageous for the geometric course of the surface of the rotor and/or of the stator forming a boundary of the air gap to be described, in a cross section parallel to the drive shaft, by a second-order curve. A curve of this type very closely approximates the geometric slewing curve of the wobbling rotor and can be manufactured relatively easily by the use of computer-aided methods during the fabrication of the rotor and/or stator.

In cases where the geometric slewing curve has only a small degree of curvature, it is advantageous to design the surfaces of the rotor and the stator forming the boundaries of the air gap as straight lines in a cross section parallel to the crankshaft, these lines being slewed with respect to the crankshaft. This also offers the advantage that the surfaces can be produced very easily.

It can be advantageous to produce the stator of the electric machine out of a stack of differently shaped individual plates. In this way, the course of the geometric slewing curve of the rotor can be transferred very accurately to the contour of the stator.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 1 is a schematic diagram of a section of an electric machine according to the invention that is parallel to a drive shaft; and FIG. 2 is a schematic diagram of a section of an electric machine, in which the adjacent surfaces of the rotor and stator are designed as straight lines.

DETAILED DESCRIPTION OF THE PRESENTLY PREFERRED EMBODIMENTS

FIG. 1 is a schematic, sectional diagram of an electric machine 2 with a rotor 3 and a stator 5, which machine serves as part of a drive unit 1. The stator 5 consists of a stack of plates 7 with coils 9 mounted on it. The stack of plates is mounted on a stator flange 11, which, on the housing side, is attached by fastening means 14 to the housing 13 of an internal combustion engine serving as the drive element. It is also possible, however, for the stack of plates to be attached to a power takeoff element such as a transmission or a torque converter. The rotor 3 of the electric machine 2 surrounds the stator 5 radially on the outside and is connected to a drive shaft 15 of the internal combustion engine for rotation in common. The rotor 3 has permanent magnets 17 arranged around the circumference, which are opposite the coils 9. The intermediate space forms an air gap 19, extending in the radial direction, with a height which is constant within the scope of manufacturing and assembly tolerances in both the circumferential and axial directions. When the stator coils 9 are supplied with current, the interaction with the magnetic fields of the permanent magnets 17 causes a magnetic field to develop, as a result of which the rotor 3 is caused to rotate and motor torque is made available. In a different mode of operation, rotational movement acting on the rotor 3 has the effect of producing generator moment in the stator coils 9. It can be seen that the electric machine 2 is a permanent-field synchronous machine of the external rotor type. With respect to the realization of the idea of the invention, however, there are no restrictions on the type of the electric machine 1. It could also be a machine with an internal rotor and could operate on the reluctance or asynchronous principle.

The drive shaft 15 in FIG. 1 represents the crankshaft of an internal combustion engine 13, which projects out of the engine's housing and is supported at this point by a bearing 21. During the operation of the internal combustion engine 13, the shaft 15 is caused to vibrate, which results in a wobbling motion of the rotor 3 connected to it. The stewing curve $V_R$ thus traversed contains primarily components in the plane of FIG. 1. Additional components of the slewing curve $V_R$ deviating from this are ignored because of their small absolute value. It can also be seen that the surfaces of the rotor and stator forming the boundaries of the air gap 19 are designed so that their course corresponds to the geometric slewing curve $V_R$ described by the wobbling motion of the rotor 3. In practice, however, it will in many cases be sufficient for achieving the object described above to design the geometric course of at least one of the surfaces in question, i.e., the surfaces of the rotor 3 and the stator 5, so that it at least approximates the geometric stewing curve $V_R$ described by the wobbling motion of the rotor 3. The surface of the stack of plates 7 facing the rotor 3 can, for example, be produced by stacking individual plates of different sizes or simply by subjecting a stack 7 of similar plates of the conventional type to a subsequent machining process. The permanent magnets 17 can be given a corresponding design by, for example, dividing them into segments and by offsetting the segments slightly with respect to each other in the radial direction. Alternatively, the permanent magnets can be produced with the desired shape right from the start when the starting material is stamped. In another variant, they can be adapted to the shape of the slewing curve $V_R$ after production by subjecting them to a subsequent machining process.

It can also be seen from FIG. 1 that the opposing surfaces of the rotor 3 and the stator 5 are essentially parallel. Thus the air gap 19 can be kept essentially constant over the entire area of magnetic interaction, even under the influence of flexural vibrations. In the example, a section of a circular curve was assumed under idealized conditions to represent the geometric stewing curve $V_R$. This means that the crankshaft executes its stewing motion exclusively in a plane parallel to the longitudinal axis. The center of rotation of the slewing in this case lies within the drive shaft 15 and axially in the area of the bearing 21. It is not necessary, however, for the center of rotation to have this axial location. The center of rotation can assume in principle any position within the axial extent of the drive shaft 15 and still be suitably described. Even a center of rotation D located outside the axial extent of the drive shaft 15 is conceivable. As explained above, the movement of the drive shaft 15 is, of course, more complicated than this in reality. A second-order curve is usually required to describe it accurately. This means that, in addition to the previously mentioned possibility of using a circular curve for descriptive purposes, a section of an ellipse, of a parabola, or of a hyperbola could be used. Of course, for an even more accurate description, it is also possible to use an even higher-order curve, such as a third- or fourth-order curve.

In FIG. 2, in contrast to FIG. 1, the surfaces of the rotor 3 and the stator 5 forming the boundaries of the air gap 19 are designed as straight lines, these lines being parallel to each other and stewed by an angle $\Theta$ with respect to the drive shaft 15. The conical design shown for the surfaces in question departs somewhat from the actual stewing curve $V_R$. If, however, as shown in the sectional diagram, the opposing edges of the rotor 3 and the stator 5 are formed by a tangent T to the stewing curve $V_R$ traversed by a point located on the surface of the rotor, this will be sufficient in practice to accomplish the specified task in many cases. Other designs not shown in the drawing are also possible, e.g., designs in which a surface, i.e., either that of the stator 5 or that of the rotor 3, conforms at least approximately to the course of the slewing curve $V_R$, whereas the other surface, in a sectional view according to FIG. 1 or FIG. 2, is designed as a straight edge.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A drive unit comprising a housing of an internal combustion engine, a drive shaft mounted for rotation in said housing, said drive shaft being a crankshaft, a stator fixed with respect to said housing, said stator having a surface forming the boundary of an air gap, a rotor coaxial to said stator and in torque-transmitting connection with the drive shaft, said drive shaft causing said rotor to exhibit a wobbling motion which describes a geometric slewing curve, said rotor having a surface forming a boundary of said air gap opposite from said surface of said stator, at least one of said surfaces approximating said geometric slewing curve in a cross section parallel to the drive shaft.

2. A drive unit as in claim 1 wherein said surfaces of said rotor and said stator are essentially parallel to each other in said cross-section parallel to said drive shaft.

3. A drive unit as in claim 1 wherein said geometric slewing curve is a second-order curve.

4. A drive unit as in claim 1 wherein said surfaces are conical surfaces, the surface of said rotor being tangent to the slewing curve.

5. A drive unit as in claim 1 wherein said stator comprises a stack of plates of mutually different shapes.

6. A drive unit as in claim 1 wherein said drive shaft is supported in said slewing curve having a center of rotation in said drive shaft, said center of rotation within said bearing.

7. A drive unit as in claim 1 wherein said rotor comprises a plurality of permanent magnets which are radially offset from each other.

8. A drive unit as in claim 1 wherein said rotor is arranged radially outside of said stator.

9. A drive unit as in claim 1 wherein said rotor is fixed against rotation with respect to said drive shaft.

* * * * *